(12) United States Patent
Kelsey et al.

(10) Patent No.: US 7,651,621 B2
(45) Date of Patent: Jan. 26, 2010

(54) METHODS FOR DEGASSING ONE OR MORE FLUIDS

(75) Inventors: Robert L. Kelsey, Fair Oaks Ranch, TX (US); Qiwei Wang, San Antonio, TX (US)

(73) Assignee: VRTX Technologies, LLC, Schertz, TX (US)

( * ) Notice: Subject to any disclaimer, the term of this patent is extended or adjusted under 35 U.S.C. 154(b) by 242 days.

(21) Appl. No.: 11/736,948

(22) Filed: Apr. 18, 2007

(65) Prior Publication Data
US 2008/0257974 A1    Oct. 23, 2008

(51) Int. Cl.
*C02F 1/20* (2006.01)

(52) U.S. Cl. .................. 210/739; 95/8; 95/260; 210/748; 210/750; 210/765; 210/787; 210/788

(58) Field of Classification Search .............. 210/750
See application file for complete search history.

(56) References Cited

U.S. PATENT DOCUMENTS

| | | | |
|---|---|---|---|
| 238,044 A | 2/1881 | Luckenbach et al. | |
| 2,773,029 A | 12/1956 | Sebald | |
| 2,821,346 A | 1/1958 | Fisher | |
| 2,825,464 A | 3/1958 | Mack | |
| 3,228,878 A | 1/1966 | Moody | |
| 3,288,292 A | 11/1966 | Stone | |
| 3,511,776 A | 5/1970 | Avampato | |
| 3,533,506 A | 10/1970 | Carr | |
| 3,539,009 A | 11/1970 | Kudlaty | |
| 4,050,426 A | 9/1977 | Sanderson | |
| 4,065,386 A | 12/1977 | Rigby | |
| 4,159,944 A | 7/1979 | Erickson et al. | |
| 4,209,359 A * | 6/1980 | Sethy | 162/29 |
| 4,250,040 A | 2/1981 | LaRaus | |
| 4,251,627 A | 2/1981 | Calamur | |
| 4,261,521 A | 4/1981 | Ashbrook | |
| 4,265,746 A | 5/1981 | Zimmerman, Sr. et al. | |
| 4,342,650 A | 8/1982 | Erickson et al. | |
| 4,357,243 A | 11/1982 | Dobrez et al. | |
| 4,412,924 A | 11/1983 | Feather | |
| 4,422,934 A | 12/1983 | Debney et al. | |
| 4,490,252 A | 12/1984 | Brigante | |
| 4,512,289 A | 4/1985 | Collins | |

(Continued)

FOREIGN PATENT DOCUMENTS

EP    02124493    7/1984

(Continued)

OTHER PUBLICATIONS

Onyeche, et al., "Sludge Homogeisation as a Means to Reduce Sledge Volume and Increase Energy Production", Electronic Journal of Environmental, Agricultural and Food Chemistry, 2003, p. 291-296.

(Continued)

*Primary Examiner*—Peter A Hruskoci
(74) *Attorney, Agent, or Firm*—Meyertons, Hood, Kivlin, Kowert & Goetzel, P.C.; Eric B. Meyertons

(57) ABSTRACT

Systems and methods to degas fluids are described herein. A fluid degassing treatment system may include a reservoir and/or one or more fluid treatment systems.

19 Claims, 7 Drawing Sheets

U.S. PATENT DOCUMENTS

| | | | |
|---|---|---|---|
| 4,519,919 A | 5/1985 | Whyte et al. | |
| 4,526,324 A | 7/1985 | Stephanoff et al. | |
| 4,532,040 A | 7/1985 | Meeks et al. | |
| 4,533,254 A | 8/1985 | Cook et al. | |
| 4,538,764 A | 9/1985 | Dunbar et al. | |
| 4,555,253 A * | 11/1985 | Hull et al. | 96/166 |
| 4,601,780 A | 7/1986 | Coggins et al. | |
| 4,645,606 A | 2/1987 | Ashbrook et al. | |
| 4,722,799 A | 2/1988 | Ashbrook | |
| 4,726,686 A | 2/1988 | Wolf et al. | |
| 4,764,283 A | 8/1988 | Ashbrook et al. | |
| 4,816,061 A | 3/1989 | Walter et al. | |
| 4,838,701 A | 6/1989 | Smith et al. | |
| 4,883,603 A | 11/1989 | Roggenstein et al. | |
| 4,908,154 A | 3/1990 | Cook et al. | |
| 4,957,626 A | 9/1990 | Ashbrook et al. | |
| 4,989,988 A | 2/1991 | Hutter et al. | |
| 5,082,633 A | 1/1992 | Stuper | |
| 5,106,022 A | 4/1992 | Pook et al. | |
| 5,106,510 A | 4/1992 | Rieber | |
| 5,114,576 A | 5/1992 | Ditzler et al. | |
| 5,116,519 A | 5/1992 | Michaluk | |
| 5,158,686 A | 10/1992 | Kigel | |
| 5,169,525 A | 12/1992 | Gerteis | |
| 5,171,090 A | 12/1992 | Wiemers | |
| 5,207,910 A | 5/1993 | Rieber | |
| 5,232,584 A | 8/1993 | Wang et al. | |
| 5,266,210 A | 11/1993 | McLaughlin | |
| 5,318,702 A | 6/1994 | Ashbrook | |
| 5,348,662 A | 9/1994 | Yen et al. | |
| 5,352,276 A | 10/1994 | Rentschler et al. | |
| 5,352,332 A | 10/1994 | Maples et al. | |
| 5,367,116 A | 11/1994 | Frey | |
| 5,435,913 A | 7/1995 | Ashbrook | |
| 5,447,642 A | 9/1995 | Schenach | |
| 5,482,369 A | 1/1996 | Verstallen | |
| 5,508,250 A | 4/1996 | Miller et al. | |
| 5,556,259 A | 9/1996 | Hlavenka | |
| 5,573,738 A | 11/1996 | Ma et al. | |
| 5,643,461 A | 7/1997 | Neff et al. | |
| 5,709,730 A | 1/1998 | Cashman | |
| 5,720,882 A | 2/1998 | Stendahl et al. | |
| 5,769,939 A | 6/1998 | Dingsoyr et al. | |
| 5,846,425 A | 12/1998 | Whiteman | |
| 5,853,535 A | 12/1998 | Maples et al. | |
| 5,927,852 A | 7/1999 | Serafin | |
| 5,931,771 A | 8/1999 | Kozyuk | |
| 5,938,892 A | 8/1999 | Maples et al. | |
| 5,954,964 A | 9/1999 | Nielsen et al. | |
| 6,013,183 A | 1/2000 | Stephenson et al. | |
| 6,045,068 A | 4/2000 | Ashbrook | |
| 6,204,225 B1 | 3/2001 | Lightcap | |
| 6,234,445 B1 | 5/2001 | Yoon | |
| 6,358,415 B1 | 3/2002 | Leung | |
| 6,361,753 B1 | 3/2002 | Cashman | |
| 6,402,065 B1 | 6/2002 | Higgins | |
| 6,428,599 B1 | 8/2002 | Cashman | |
| 6,443,610 B1 | 9/2002 | Shechter et al. | |
| 6,514,458 B1 | 2/2003 | Czechowski et al. | |
| 6,555,002 B2 | 4/2003 | Garcia et al. | |
| 6,607,651 B2 | 8/2003 | Stiller | |
| 6,635,178 B2 | 10/2003 | Bowman et al. | |
| 6,645,713 B2 | 11/2003 | Saito | |
| 6,649,059 B2 | 11/2003 | Romanyszyn et al. | |
| 6,656,247 B1 | 12/2003 | Genik-Sas-Berezowsky et al. | |
| 6,685,834 B1 | 2/2004 | Murthy et al. | |
| 6,712,968 B2 | 3/2004 | Romanyszyn | |
| 6,745,961 B2 | 6/2004 | Korstvedt | |
| 6,764,213 B2 | 7/2004 | Shechter | |
| 6,773,603 B2 | 8/2004 | Moorehead et al. | |
| 6,797,170 B2 | 9/2004 | Romanyszyn | |
| 6,811,698 B2 | 11/2004 | Romanyszyn | |
| 6,811,712 B2 | 11/2004 | Romanyszyn | |
| 6,827,861 B2 | 12/2004 | Kerfoot | |
| 6,866,703 B2 * | 3/2005 | Mazzei | 96/209 |
| 6,951,618 B2 | 10/2005 | Rossmoore | |
| 7,045,542 B1 | 5/2006 | Beilfuss et al. | |
| 7,087,178 B2 | 8/2006 | Romanyszyn et al. | |
| 7,247,242 B1 | 7/2007 | Moore et al. | |
| 7,254,879 B2 | 8/2007 | Romanyszyn et al. | |
| 7,422,695 B2 * | 9/2008 | Foret | 210/748 |
| 7,485,671 B2 | 2/2009 | Qiu et al. | |
| 2002/0196702 A1 | 12/2002 | Shechter | |
| 2006/0257969 A1 | 11/2006 | Hug | |
| 2006/0272624 A1 | 12/2006 | Pettersson | |
| 2008/0061008 A1 | 3/2008 | Kelsey et al. | |
| 2008/0257411 A1 | 10/2008 | Kelsey et al. | |
| 2008/0257828 A1 | 10/2008 | Kelsey et al. | |
| 2008/0257974 A1 | 10/2008 | Kelsey et al. | |
| 2008/0289502 A1 * | 11/2008 | Betting et al. | 95/248 |
| 2009/0026133 A1 | 1/2009 | Kelsey et al. | |
| 2009/0152212 A1 | 6/2009 | Kelsey et al. | |

FOREIGN PATENT DOCUMENTS

| | | |
|---|---|---|
| JP | 2001314888 | 11/2001 |
| JP | 2005238000 | 8/2005 |
| KR | 20020090820 | 12/2002 |
| WO | 0204124 | 1/2002 |
| WO | 0242002 | 5/2002 |
| WO | 2005058760 | 6/2005 |

OTHER PUBLICATIONS

Fairey, et al., "Evaluation of Kady Biolysis System (BLSTM) at the Plum Island Wastewater Treatment Plant", Mar. 4, 2004, p. 1-16, available from Charleston Water System website at http://www.charlestonwater.com/public_info_research_papers.htm.
PCT Application No. PCT/US2008/060915, Search Report, Mailed Sep. 30, 2008.
PCT Application No. PCT/US2008/060916, Search Report, Mailed Sep. 30, 2008.
PCT Application No. PCT/US2008/060918, Search Report, Mailed Sep. 30, 2008.
Office Action issued On Sep. 15, 1993 for U.S. Appl. No. 07/900,130.
Office Action issued On Aug. 8, 1989 for U.S. Appl. No. 07/089,071.
Office Action issued On Jan. 26, 1990 for U.S. Appl. No. 07/089,071.
Office Action issued On Aug. 14, 1987 for U.S. Appl. No. 07/018,049.
Office Action issued On Feb. 27, 1986 for U.S. Appl. No. 06/726,429.
Office Action issued On Jul. 2, 1980 for U.S. Appl. No. 06/126,345.
Office Action issued On Nov. 30, 2005 for U.S. Appl. No. 10/669,019.
Office Action issued On Dec. 12, 2006 for U.S. Appl. No. 10/668,123.
Office Action issued On Dec. 5, 2002 for U.S. Appl. No. 10/016,491.
Office Action issued On Mar. 5, 2003 for U.S. Appl. No. 10/016,491.
Office Action issued On Nov. 5, 2002 for U.S. Appl. No. 09/899,467.
Office Action issued On Feb. 12, 2003 for U.S. Appl. No. 09/899,467.
Office Action issued On Jul. 16, 2003 for U.S. Appl. No. 09/899,467.
Office Action issued On Feb. 17, 1999 for U.S. Appl. No. 08/991,667.
Office Action issued On Apr. 13, 1999 for U.S. Appl. No. 08/991,667.
Office Action issued On Aug. 26, 1999 for U.S. Appl. No. 08/991,667.
PCT Application No. PCT/US2002/042002, Search Report, Mailed Apr. 12, 2002.
PCT Application No. PCT/US2002/004124, Search Report, Completed Sep. 30, 2002.
Co-pending U.S. Appl. No. 11/519,986 entitled "Systems and Methods for Treating Metalworking fluids", to Kelsey et al. filed Sep. 12, 2006; available in PAIR.
Co-pending U.S. Appl. No. 11/736,984 entitled "Systems and Methods for Preparation of Emulsions", to Kelsey et al. filed Apr. 18, 2007; available in PAIR.

Co-pending U.S. Appl. No. 11/736,994 entitled "Systems and Methods for Treatment of Groundwater", to Kelsey et al. filed Apr. 18, 2007; available in PAIR.

Co-pending U.S. Appl. No. 11/737,006 entitled "Systems and Methods for Reduction of Metal Contaminants in Fluids", to Kelsey et al. filed Apr. 18, 2007; available in PAIR.

Communication, EPO Application No. 01950877.9-2307; dated Jun. 26, 2009 (S1).

Communication, EPO Application No. 01950877.9-2307; dated Mar. 3, 2007 (S2).

U.S. Patent and Trademark Office, "Office Action" for U.S. Appl. No. 11/519,986 mailed Mar. 17, 2009, available in PAIR.

U.S. Patent and Trademark Office, "Office Action" for U.S. Appl. No. 11/736,984 mailed Mar. 19, 2009, available in PAIR.

U.S. Patent and Trademark Office, "Office Action" for U.S. Appl. No. 11/737,006 mailed Mar. 18, 2009, available in PAIR.

U.S. Patent and Trademark Office, "Office Action" for U.S. Appl. No. 12/030,643 mailed Mar. 18, 2009, available in PAIR.

* cited by examiner

METHODS FOR DEGASSING ONE OR MORE FLUIDS

BACKGROUND

1. Field of the Invention

The present invention relates to degassing one or more fluids. More particularly, the invention relates to degassing a fluid using a hydrodynamic cavitation system.

2. Brief Description of the Related Art

Gasses tend to be produced during handling of various fluids such as industrial water (e.g. boiler water), fluids (including non-flammable fluids) used in hydraulic systems, alkanolamine systems, slurries for ceramic materials, slurries used as coating solutions, in paper-making machines for making coated paper, coating solutions, lubricants, cooling liquids for quenching, chemical solutions, food preparations. Gases produced during fluid handling may cause erosion due to aeration, structural weakening due to cavitation, noise, degradation of the fluids, non-uniformity in materials and/or low quality products. Thus, removal of gases from fluids is desired. Separation of gases from fluids may be difficult because the initiating force for release of gases is a reduction in absolute pressure and associated partial pressure of the gas to be evolved.

SUMMARY

Systems and methods to degas fluids are described herein. The fluids may include dissolved gases such as carbon dioxide, oxygen, ammonia, hydrogen sulfide, carbon monoxide, methane, ethane, or mixtures thereof. In some embodiments, an amount of dissolved gas may be reduced and/or controlled to acceptable parts per million (ppm) levels with a fluid treatment system. A fluid treatment system includes a first vortex nozzle unit and a second vortex nozzle unit positioned opposed to the first vortex nozzle unit. The fluid stream that includes the dissolved gasses is introduced into the fluid treatment system. A first portion of the fluid stream flows through the first vortex nozzle unit and a second portion of the fluid stream flows through the second vortex nozzle unit. The fluid stream exiting the first vortex nozzle unit contacts the second portion of the fluid stream exiting the second vortex nozzle unit. Contact of the fluid stream exiting the first vortex nozzle unit with the fluid stream exiting the second vortex nozzle unit removes at least a portion of one or more dissolved gasses in the fluid.

In some embodiments, the fluid treatment system is coupled to a reservoir that contains a fluid that includes one or more dissolved gasses. A conduit may couple the reservoir to an inlet of the fluid treatment system. An additional conduit may couple the fluid treatment system back to the reservoir. During use, at least a portion of the treated fluid exiting the fluid treatment system may be sent to the reservoir or distributed to other processing and/or storage units.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
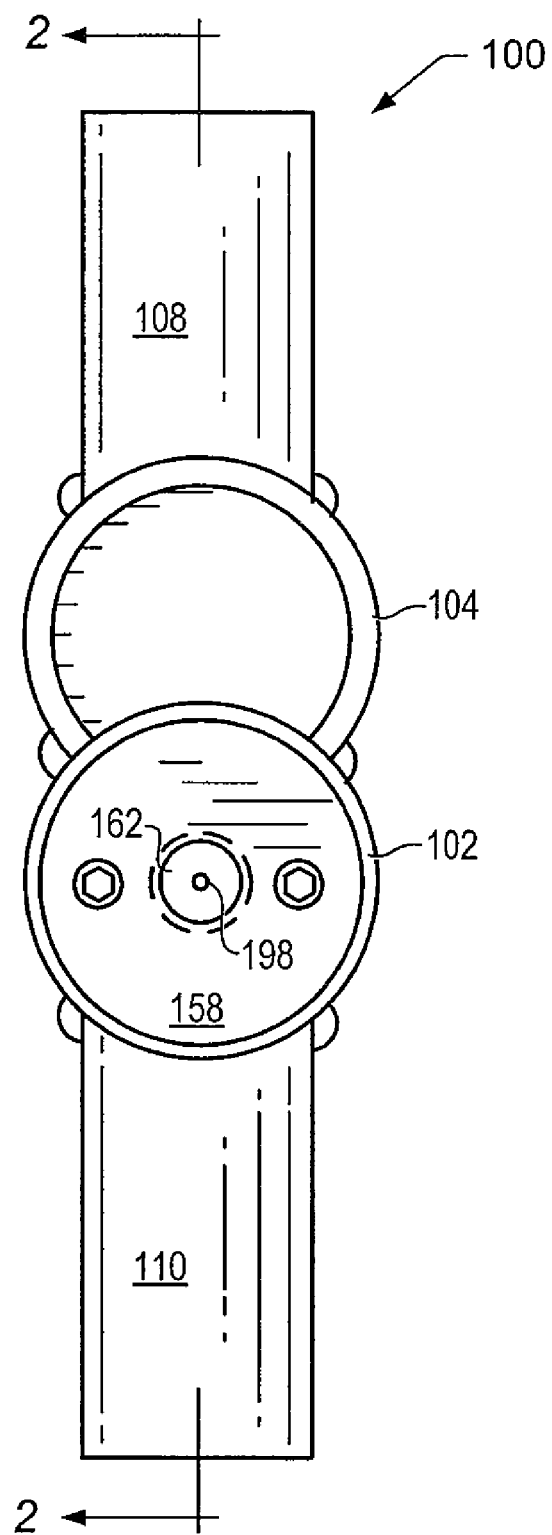
FIG. 1 depicts a top view of an embodiment of a fluid treatment system.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION

Systems and methods for degassing fluids are described herein. Selected terms used herein are listed below.

"Fluids" refer to water and/or nonaqueous solutions. Nonaqueous solutions may include organic and/or inorganic compounds. Examples of nonaqueous solutions include, but are not limited to, hydraulic fluids and/or alkanolamines.

"Streams" refer to a stream or a combination of streams. The term fluid and/or stream may be used interchangeably.

It is to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a nozzle" includes a combination of two or more nozzles.

Fluids may include one or more dissolved gases (for example, oxygen, carbon dioxide, hydrogen sulfide, methane or mixtures thereof). Degassing of a fluid may include sparging and/or chemically treating the fluid to remove the undesired gases. For example, oxygen scavenging chemicals may be added to the fluid to reduce the concentration of oxygen in the water. Treating one or more fluids in a fluid treatment system may efficiently degas the fluid. In some embodiments, the fluid treatment system may be a hydrodynamic cavitation system marketed by VRTX Technologies (Schertz, Tex.).

In certain embodiments, a fluid treatment system includes a first vortex nozzle unit positioned in opposed relationship to a second vortex nozzle unit, and a pressure-equalizing chamber that delivers a flow of a stream to each of the nozzle units. As used herein the term "vortex nozzle unit" refers to a single vortex nozzle or a plurality of vortex nozzles coupled together. The pressure-equalizing chamber receives a stream from a pump and delivers the stream into the first vortex nozzle unit and the second vortex nozzle unit. The first and second vortex nozzle units receive the stream therein and impart rotation to the stream, thereby creating a first rotating stream and a second rotating stream, respectively. The fluid treatment system further includes a collision chamber where impingement of the first rotating stream flow with the second rotating stream flow occurs.

In some embodiments, a fluid treatment system may include two sets of opposed cascaded vortex nozzles. For example, a vortex nozzle unit may include a cascaded vortex nozzle pair, which includes a first vortex nozzle having a second vortex nozzle cascaded within it. The vortex nozzle unit further includes a second cascaded vortex nozzle pair, which includes a third vortex nozzle having a fourth vortex nozzle cascaded within it. More particularly, the outlet from the second nozzle communicates with an inlet into the first nozzle and the outlet from the fourth nozzle communicates with an inlet into the third nozzle. Each of the four vortex nozzles receives a fluid through an inlet that communicates with a stream to impart a rotation to the stream passing through the nozzles. The cascaded vortex nozzles are positioned in opposed relation and communicate with a chamber so that the streams exiting the nozzles rotate in opposite directions to collide at approximately the mid-point of the chamber. The two counter-rotating streams exiting the nozzles collide at high velocity to create a compression wave throughout the fluid.

Hydrodynamic cavitation systems and other fluid treatments systems are described in U.S. Pat. No. 4,261,521 to Ashbrook; U.S. Pat. No. 4,645,606 to Ashbrook et al.; U.S. Pat. No. 4,722,799 to Ashbrook et al.; U.S. Pat. No. 4,764,283 to Ashbrook et al.; U.S. Pat. No. 4,957,626 to Ashbrook; U.S. Pat. No. 5,318,702 to Ashbrook; U.S. Pat. No. 5,435,913 to Ashbrook; U.S. Pat. No. 6,045,068 to Ashbrook; U.S. Pat. No. 6,649,059 to Romanyszyn et al; U.S. Pat. No. 6,712,968 to Romanyszyn; U.S. Pat. No. 6,797,170 to Romanyszyn; U.S. Pat. No. 6,811,698 to Romanyszyn; U.S. Pat. No. 6,811,712 to Romanyszyn; and U.S. Pat. No. 7,087,178 to Romanyszyn et al.; and U.S. patent application Ser. No. 11/519,986 entitled "SYSTEMS AND METHODS FOR MICROBIOLOGICAL CONTROL IN METAL WORKING FLUIDS" to Kelsey et al., filed Sep. 12, 2006 and U.S. Provisional Patent Application No. 60/901,814 to Kelsey et al., entitled "SYSTEMS AND METHODS FOR TREATMENT OF WASTEWATER" filed Feb. 13, 2007, all of which are herein incorporated by reference.

Figure 2:
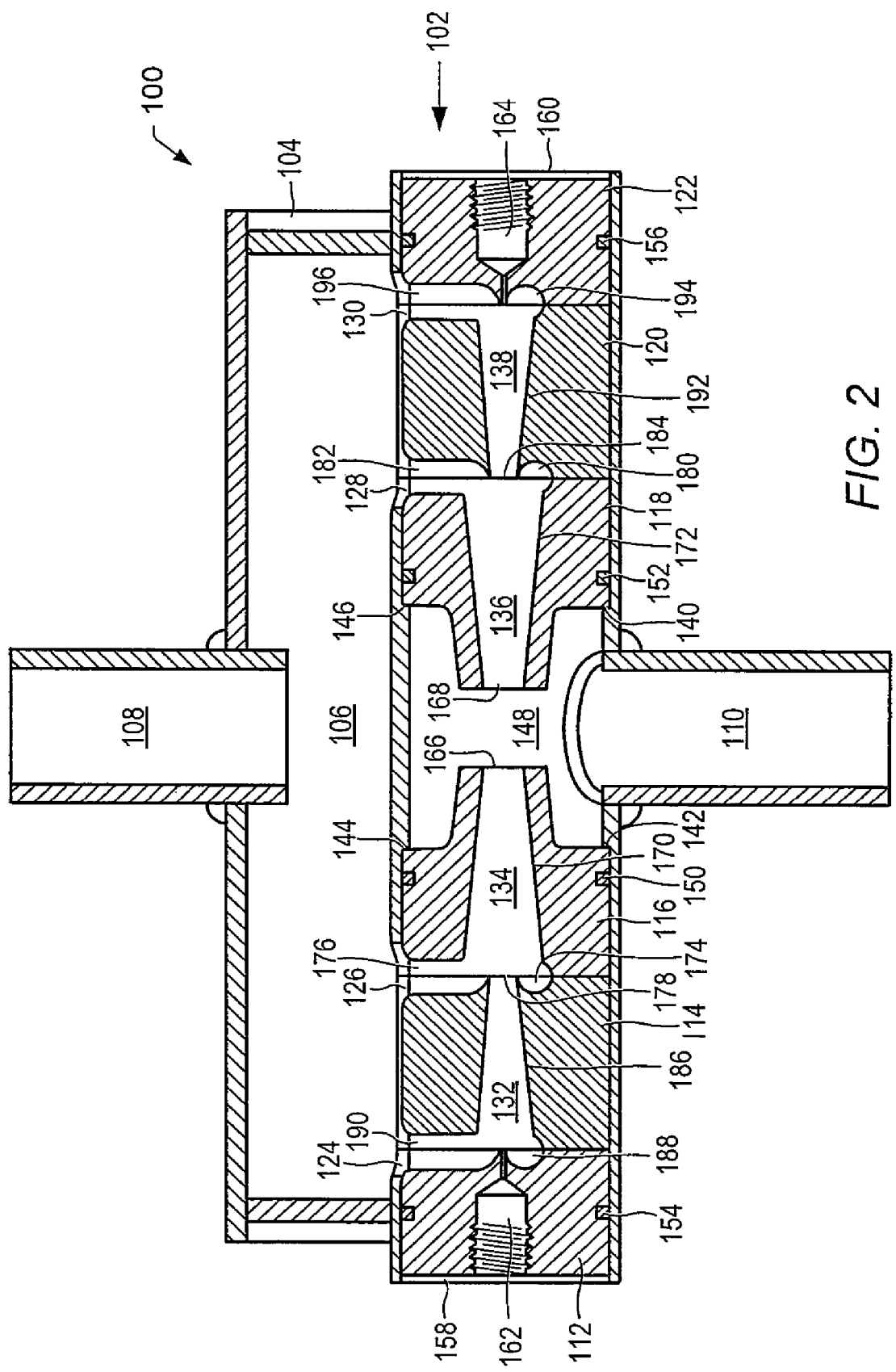
FIG. 2 is a cross-sectional view of the fluid treatment system depicted in FIG. 1 taken substantially along line 2-2.

FIGS. 1 and 2 depict an embodiment of a fluid treatment system. Fluid treatment system 100 includes cylindrical body portions 102 and 104 formed integrally using any standard machining or molding process. Cylindrical body portion 104 defines chamber 106 and includes inlet 108 which may be attached to a stream source. Cylindrical body 102 defines a chamber and includes outlet 110 that attaches to any suitable conduit, reservoir, or any suitable fluid delivery means.

Cylindrical body portion 102 houses within its chamber vortex nozzle assembly blocks 112-122 (see FIG. 2). Additionally, cylindrical body 102 includes inlets 124-130 which communicate with chamber 106 of cylindrical body portion 104. The structure of vortex nozzle assembly blocks 112-122 are similar to those described in U.S. Pat. No. 4,261,521 to Ashbrook; U.S. Pat. No. 4,957,626 to Ashbrook et al., and U.S. Pat. No. 5,318,702 to Ashbrook. Each of vortex nozzle assembly blocks 112-122 are shaped using any standard machining or molding process to define a portion of vortex nozzles 132-138. Vortex assembly blocks 112, 114, and 116 define the first vortex nozzle unit and vortex assembly blocks 118, 120, and 122 define the second vortex nozzle unit.

Vortex nozzle assembly blocks 116 and 118 are inserted within the chamber defined by cylindrical body portion 102 until their inner edges contact ledges 140, 142 in body portion 102. Ledges 140, 142 prevent vortex nozzle assembly blocks 116 and 118 from being inserted the center of the chamber defined within cylindrical body portion 102. Vortex nozzle assembly blocks 116 and 118 reside within cylindrical body portion 102 such that they define chamber 148, which communicates with outlet 110. Vortex nozzle assembly blocks 116 and 118 include o-rings 150 and 152, respectively, which form a fluid seal between vortex nozzle assembly blocks 116 and 118 and the inner surface of cylindrical body portion 102.

After the insertion of vortex nozzle assembly blocks 116 and 118 to the position shown in FIG. 2, vortex nozzle assembly blocks 114 and 120 are inserted until they abut the rear portions of vortex nozzle assembly blocks 116 and 118, respectively. Finally, vortex nozzle assembly blocks 112 and 122 are inserted until they abut the rear portions of vortex nozzle assembly blocks 114 and 120, respectively. Vortex nozzle assembly blocks 112 and 122 include o-rings 154 and 156, respectively, which form a fluid seal between vortex nozzle assembly blocks 112 and 122 and the inner surface of cylindrical body portion 102.

Cylindrical body portion 102 includes plates 158 and 160 that fit within the entrances at either end of the cylindrical body portion. Plates 158 and 160 mount over vortex nozzle assembly blocks 112 and 122, respectively, using any suitable means (e.g., screws) to secure vortex nozzle assembly blocks 112-122 with the chamber defined by cylindrical body portion 102.

With vortex nozzle assembly blocks 112-122 positioned and secured within the chamber defined by cylindrical body portion 102, vortex nozzle assembly blocks 112-122 define vortex nozzles 132-138 and conduits 162 and 164. Vortex nozzles 134 and 136 are positioned in opposed relation so that a stream of water exiting their outlets 166 and 168, respectively, will collide approximately at the mid-point of chamber 148. Vortex nozzle assembly blocks 116 and 118 define frustro-conical inner surfaces 170 and 172 of vortex nozzles 134 and 136, respectively. The abutment of vortex nozzle assembly block 116 with vortex nozzle assembly block 114 defines circular portion 174 and channel 176, which communicates with inlet 126. Additionally, outlet 178 from vortex nozzle 132 communicates with circular portion 174 of vortex nozzle 134. Similarly, vortex nozzle blocks 118 and 120 define circular portion 180 and channel 182, which communicates with inlet 128, while outlet 184 from vortex nozzle 138 communicates with circular portion 180 of vortex nozzle 136.

Vortex nozzle assembly block 114 defines frustro-conical inner surface 186, while the abutment between vortex nozzle assembly blocks 112 and 114 defines circular portion 188 and channel 190, which communicates with inlet 124. Vortex nozzle assembly block 120 defines frustro-conical inner surface 192 and the abutment between vortex nozzle assembly blocks 120 and 122 defines circular portion 194 and channel 196, which communicates with inlet 130. Vortex nozzle assembly blocks 112 and 122 include conduits 162 and 164, respectively, which communicate to the exterior of cylindrical body portion 102 via opening 198 in plate 158 (see FIG. 1) and another opening in plate 160 (not shown). Conduits 162 and 164 permit additives to be introduced into vortex nozzles 132-138 during treatment of a fluid.

In operation, fluid is pumped into chamber 106 via inlet 108. The fluid flows from chamber 106 into channels 190, 176, 182, and 196 via inlets 124-130, respectively, of cylindrical body portion 102. Channels 190, 176, 182, and 196 deliver the fluid to circular portions 188, 174, 180, and 194, respectively, of vortex nozzles 132-138. Circular portions 188, 174, 180, and 194 impart a circular rotation to the water and deliver the circularly rotating water streams into frustro-conical inner surfaces 186, 170, 172, and 192, respectively. Frustro-conical inner surfaces 186, 170, 172, 192 maintain the circular rotation in their respective water stream and deliver the circularly rotating water streams to outlets 178, 166, 168, and 184, respectively, from vortex nozzles 132-138.

Due to the cascaded configuration of vortex nozzles 132 and 138, the water streams exiting outlets 178 and 184 enter vortex nozzles 134 and 136, respectively. Those circularly rotating streams combine with the circularly rotating streams within vortex nozzles 134 and 136 to increase the velocity of the circularly rotating streams therein. Additionally, as the streams exiting vortex nozzles 132 and 138 contact the streams within vortex 134 and 136, they strike the circularly rotating streams within vortex nozzles 134 and 136 such that they create compression waves therein.

The combined streams from vortex nozzles 132 and 134 and the combined streams from vortex nozzles 138 and 136 exit vortex nozzles 134 and 136 at outlets 166 and 168, respectively, and collide at approximately the mid-point of chamber 148. The streams are rotating oppositely as they exit vortex nozzles 134 and 136 because vortex nozzles 134 and 136 are positioned in an opposed relationship. As the exiting streams collide, additional compression waves are created which combine with the earlier compression waves to create compression waves having amplitudes greater than the original waves. The recombined water streams exit chamber 148 into outlet 110. The compression waves created by the collision of the exiting streams are sufficient to remove at least a portion of the gases present in the stream entering inlet 108. The compression waves are sufficient to reduce a size of particles in a stream, vaporize volatile materials, and/or compress particulate matter such that liquid is removed from the particulate matter.

Although the above description depicts a pair of cascaded nozzles, such description has been for exemplary purposes only, and, as will be apparent to those of ordinary skill in the art, any number of vortex nozzles may be used.

Figure 3:
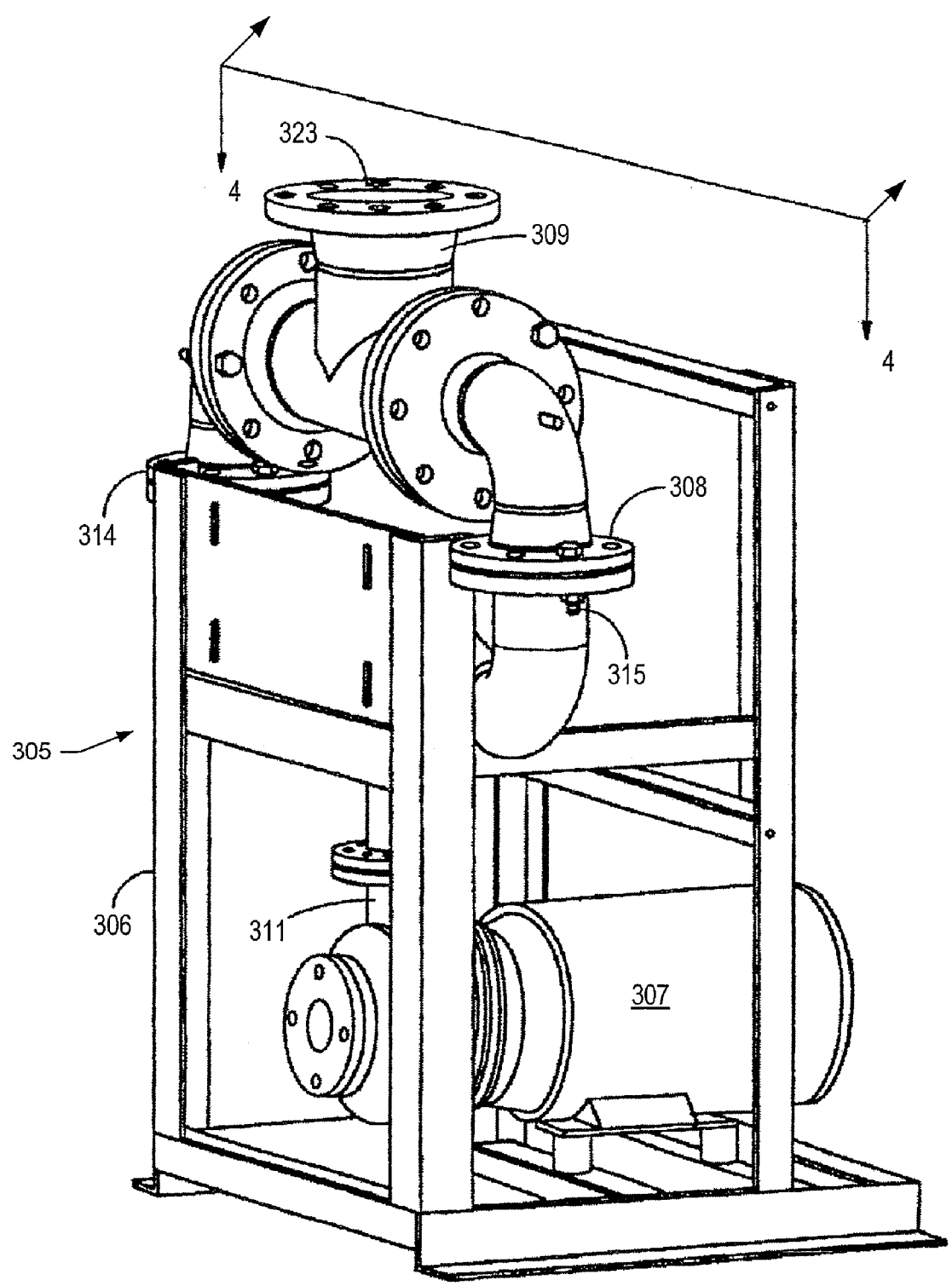
FIG. 3 is a perspective view of a fluid treatment system.
Figure 4:
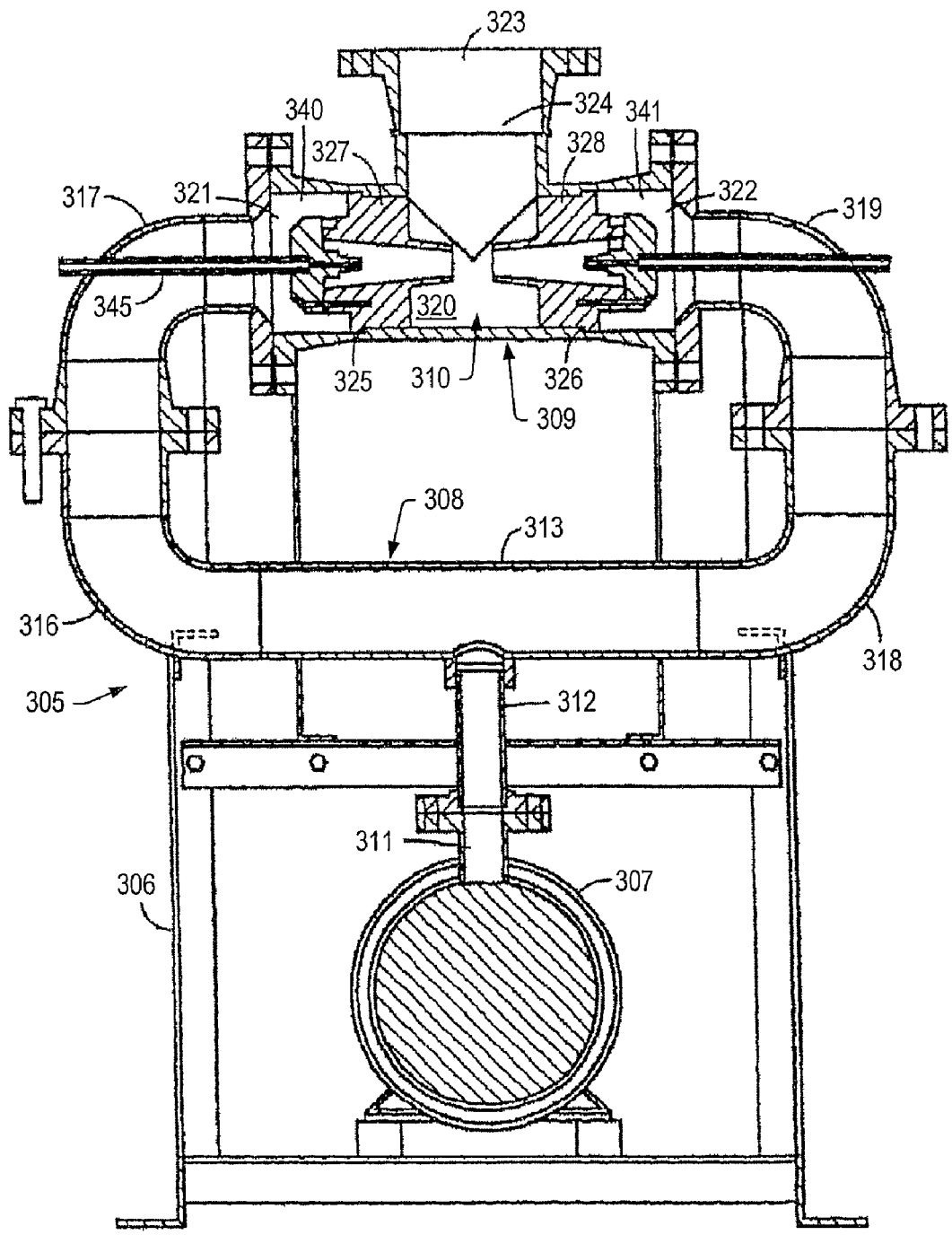
FIG. 4 is a cross-sectional view of the fluid treatment system depicted in FIG. 3 taken substantially along plane 4-4.
Figure 5:
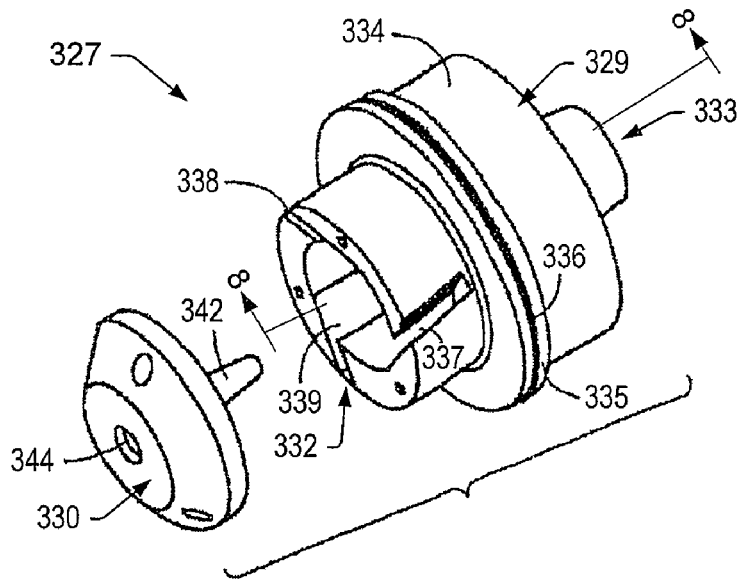
FIG. 5 is a perspective view illustrating a vortex nozzle of the apparatus for treating fluids.
Figure 6:
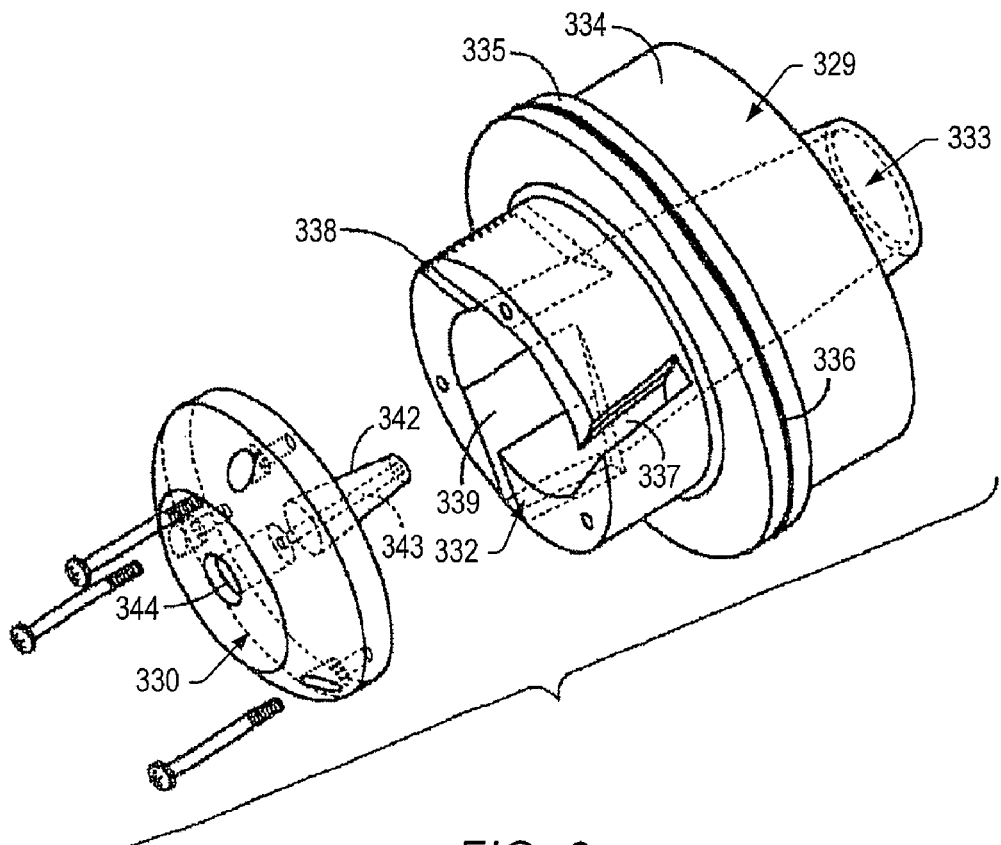
FIG. 6 is an alternate perspective view illustrating a vortex nozzle of the apparatus for treating fluids.
Figure 7:
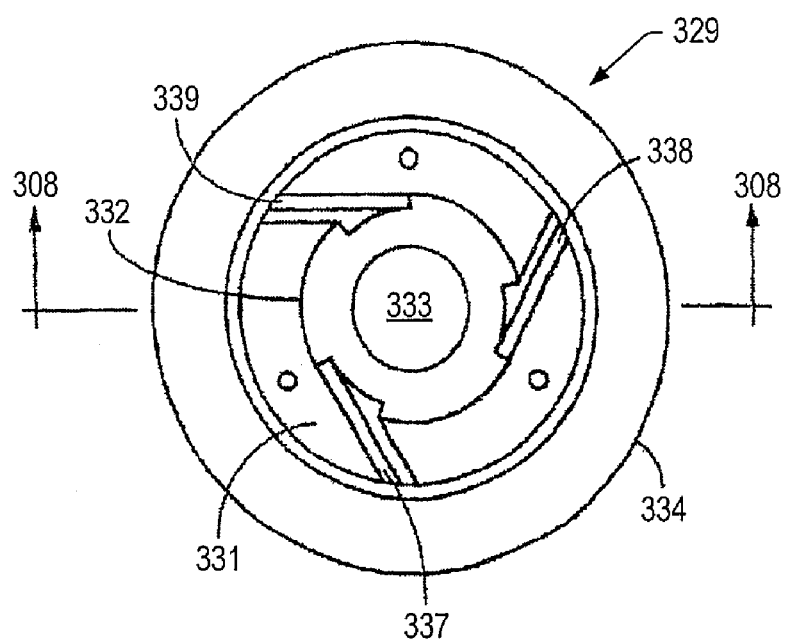
FIG. 7 is an end view illustrating an inlet side of a vortex nozzle body of the vortex nozzle.
Figure 8:
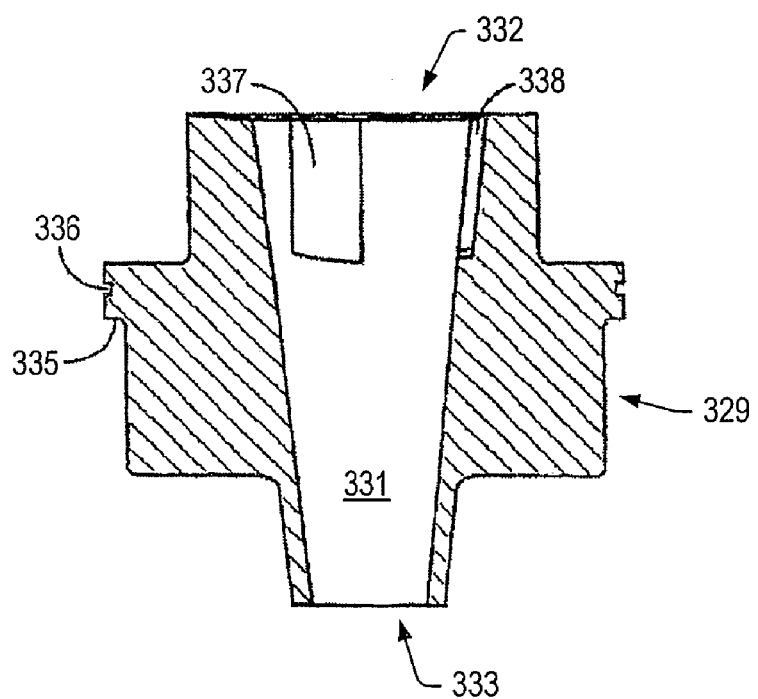
FIG. 8 is a cross-sectional view of FIG. 5 taken substantially along lines 8-8 illustrating the vortex nozzle body of the vortex nozzle.

FIGS. 3 and 4 depict an embodiment of a fluid treatment system. Apparatus 305 includes frame 306 for supporting pump 307 and manifold 308. Pump 307 and manifold 308 may be coupled to frame 306 using any suitable coupling means (e.g., brackets). Apparatus 305 may includes housing 309 secured to manifold 308 and vortex nozzle assembly 310. Vortex nozzle assembly 310 is disposed in housing 309.

Pump 307 includes outlet 311 and is any suitable pump capable of pumping fluid from a fluid source through apparatus 305. As shown, pump 307 delivers fluids, those of ordinary skill in the art will recognize many other suitable and equivalent means for delivering fluids, such as pressurized gas canisters may be used.

Manifold 308 includes inlet 312, diverter 313, and elbows 316-319. Inlet 312 couples to outlet 311 of pump 307 using any suitable means (e.g., flange and fasteners) to receive fluid flow from the pump. Inlet 312 fits within an inlet of diverter 313 and is held therein by friction, threading, welding, glue, or the like, to deliver fluid into the diverter. Diverter 313 receives the fluid flow therein and divides the fluid flow into a first fluid flow and a second fluid flow by changing the direction of fluid flow substantially perpendicular relative to the flow from inlet 312. Diverter 313 connects to elbows 316 and 318 by friction, threading, welding, glue, or the like, to deliver the first fluid flow to elbow 317 and the second fluid flow to elbow 319. Elbows 317 and 319 reverses its respective fluid flow received from the diverter 313 to deliver the fluid flow to housing 309. Conduits 345 may pass through portions of elbows 317, 319 to allow for pressure measurements and/or for the introduction of fluid or fluids to the streams entering housing 309. As shown, manifold 308 delivers fluid flow into housing 309, those of ordinary skill in the art will recognize many other suitable and equivalent means, such as two pumps and separate connections to housing 309 or a single pump delivering fluid into side portions of housing 309 instead of end portions.

Housing 309 includes inlets 321, 322, outlet 323, and ledgers 325 and 326. Housing 309 defines bore 320 along its central axis and bore 324 positioned approximately central to the midpoint of housing 309 and communicating with bore 320. Housing 309 is attached to elbows 317 and 319, using any suitable means, such as flanges and fasteners. Housing 309 receives a first fluid flow at inlet 321 and a second fluid flow at inlet 322. Outlet 323 is connectable to any suitable fluid storage or delivery system using well-known piping means.

Vortex nozzle assembly 310 resides within bore 320 and, in one embodiment, includes vortex nozzles 327 and 328, which are positioned within bore 320 of housing 309 in opposed relationship to impinge the first fluid flow with the second fluid flow, thereby treating the flowing fluid. With vortex nozzle 327 inserted into housing 309, vortex nozzle 327 and housing 309 define cavity 340, which receives the first fluid flow from elbow 317 and delivers the first fluid flow to vortex nozzle 327. Similarly, with vortex nozzle 328 inserted into housing 309, vortex nozzle 328 and housing 309 define cavity 341, which receives the second fluid flow from elbow 319 and delivers the second fluid flow to vortex nozzle 327.

As illustrated in FIGS. 4-8, vortex nozzle 327 includes nozzle body 329 and end cap 330. For the purposes of disclosure, only vortex nozzle 327 will be described herein, however, it should be understood that vortex nozzle 328 may be identical in design, construction, and operation to vortex nozzle 327 and merely positioned within bore 320 of housing 309 in opposed relationship to vortex nozzle 327 to facilitate impingement of the second fluid flow with the first fluid flow.

Nozzle body 329, in one embodiment, is substantially cylindrical in shape and includes tapered passageway 331 located axially therethrough. The tapered passageway 331 includes inlet side 332 and decreases in diameter until terminating at an outlet side 333. The taper of the tapered passageway 331 is at least 1° and at most 90°. In some embodiments, the taper of the tapered passageway is at least 5° and at most 60°.

Nozzle body 329 includes shoulder 334 having raised portion 335 with groove 336 therein. Shoulder 334 is sized to frictionally engage vortex nozzle 327 with an interior surface of housing 309, while raised portion 335 of the vortex nozzle abuts ledge 325, thereby controlling the position of vortex nozzle 327 within the housing 309. Groove 336 receives a seal as o-ring to seal nozzle body 329 with housing 309 and, thus, vortex nozzle 327 within housing 309.

Nozzle body 329 further includes ports 337-339 for introducing fluid into tapered passageway 331 of vortex nozzle 327. As shown, ports 337-339 may be equally spaced radially about the nozzle body 329 beginning at inlet side 332. Although three ports 337-339 are shown, those of ordinary skill in the art will recognize that any number of ports may be utilized. Furthermore, ports 337-339 may be any shape suitable to deliver fluid into the tapered passageway 331, such as elliptical, triangular, D-shaped, and the like.

As shown, ports 337-339 are tangential to the inner surface of tapered passageway 331 and enter tapered passageway 331 at the same angle as the taper of the tapered passageway, which enhances the delivery of the fluid into tapered passageway 331 and, ultimately, the distribution of the fluid around the tapered passageway. Although tangential ports 337-339 are shown as being angled with the taper of the tapered passageway 331, those of ordinary skill in the art will recognize that the ports 337-339 may enter tapered passageway 331 at any angle relative to the taper of the tapered passageway 331.

End cap 330 abuts the end of nozzle body 329, defining inlet side 332, to seal inlet side 332, and thereby permitting fluid to enter into the tapered passageway 331 through ports 337-339. End cap 330 may include boss 342 formed integrally therewith or attached thereto at approximately the center of the inner face of the end cap. In this embodiment, the boss 342 is conical in shape and extends into tapered passageway 331 to adjust the force vector components of the fluid entering tapered passageway 331. Passageway 343 through boss 342 communicates with cavity 344 at approximately the center of the outer face of end cap 330. Conduit 345 (see FIG. 4) fits within cavity 344 to permit measurement of a vacuum within tapered passageway 331.

A flow of fluid delivered to vortex nozzle 327 enters tapered passageway 331 via ports 337-339. The entry of fluid through ports 337-339 imparts a rotation to the fluid, thereby creating a rotating fluid flow that travels down tapered passageway 331 and exits outlet side 333. Each port 337-339 delivers a portion of the fluid flow to tapered passageway 331. The flow may be in multiple bands that are distributed uniformly in thin rotating films about tapered passageway 331. This minimizes pressure losses due to internal turbulent motion. Accordingly, vortex nozzle 327 provides for a more intense and stable impact of rotating fluid flow exiting outlet side 333 of tapered passageway 331 with fluid exiting vortex nozzle 328.

In some embodiments, a cross-sectional area of ports 337-339 is less than the cross-sectional area of inlet side 332 of tapered passageway 331, which creates a reduced pressure within the rotating fluid flow. It should be understood to those of ordinary skill in the art that the size of ports 337-339 may be varied based upon particular application requirements. The amount of vacuum created by ports 337-339 may be adjusted utilizing boss 342 to alter the force vectors of the rotating fluid flow. Illustratively, increasing the size of boss 342 (e.g., either diameter or length) decreases the volume within the tapered passageway 331 tillable with fluid, thereby increasing the vacuum and, thus, providing the rotating fluid flow with more downward and outward force vector components.

In operation, manifold 308 is assembled as previously described and connected to pump 307. Vortex nozzles 327 and 328 are inserted in opposed relationship into housing 309 as previously described, and housing 309 is connected to manifold 308. Pump 307 pumps fluid from a fluid source and delivers the fluid into manifold 308, which divides the fluid into a first fluid flow and a second fluid flow. Manifold 308 delivers the first fluid flow into cavity 340 of housing 309 and the second fluid flow into cavity 341 of housing 309. The first fluid flow enters vortex nozzle 327 from cavity 340 via the ports of vortex nozzle 327. Vortex nozzle 327 receives the fluid therein and imparts rotation to the fluid, thereby creating a first rotating fluid flow that travels down vortex nozzle 327 and exits its outlet side. Similarly, the second fluid flow enters vortex nozzle 328 from cavity 341 via the ports of vortex nozzle 328. Vortex nozzle 328 receives the fluid therein and imparts rotation to the fluid, thereby creating a second rotating fluid flow that travels down vortex nozzle 328 and exits its outlet side. Due to the opposed relationship of vortex nozzles 327 and 328, the first rotating fluid flow impinges the second rotating fluid flow, resulting in the treatment of the fluid through the breaking of molecular bonding in the fluid and/or the reduction in size of solid particulates within the fluid. The treated fluid then exits outlet 323 of housing 309 and travels to a suitable fluid storage or delivery system.

Processing streams with any of the above-described fluid treatment systems removes at least a portion of gases in the fluid. In some embodiments, processing streams with any of the above-described fluid treatment systems may aerate the stream and/or reduce particle size of particulates of the treated stream. In certain embodiments, processing streams with any of the above-described fluid treatment systems will remove at least a portion of the chlorine, volatile organic compounds, and/or dissolved gases in the fluid. Hydrodynamic cavitation and/or other forces exerted on the fluid (e.g., pressure impulse, side walls of the nozzles) in a fluid treatment system may cause changes in solubility of dissolved gasses, pH changes, formation of free radicals, and/or precipitation of dissolved ions such as phosphates, nitrates, calcium, iron, and carbonate.

In certain embodiments, additives may be added to aid in the removal of dissolved gases. In some embodiments, degassing of the fluid may be enhanced by minimizing the absolute pressure of the cavity and/or by flushing the cavity with an inert gas to reduce the dissolved gas partial pressure.

In some embodiments, a fluid treatment system may include an inlet. The inlet may be coupled to a conduit and/or reservoir of a treatment system. The concentration of contaminants in the reservoir and/or in lines coupling the fluid treatment system to the treatment system may be monitored. In some embodiments, a stream may be continuously processed by the fluid treatment system. That is the stream may be continuously drawn from a reservoir, into the fluid treatment system and returned to the reservoir, to control the degree of aeration, reduction of volatile organic compounds, reduction of dissolved gasses, reduction in particulate size, eradication of bacteria, or combinations thereof. Additionally, the concentration of dissolved gases, and/or VOCs in the fluid exiting the fluid treatment system may be monitored. If the fluid exiting the fluid treatment system is not within a predetermined acceptable range, the fluid may be recycled back into the fluid treatment system.

Pressure equalizing manifolds and/or stabilization chambers may be coupled to the fluid inlet of a fluid treatment system. In some embodiments, a pump may be coupled to the inlet to increase the velocity and/or pressure at which a stream enters a vortex nozzle unit. In other embodiments, a pump is not coupled to the system. The inlet may be coupled to each vortex nozzle unit. If a vortex nozzle unit includes two or more vortex nozzles, the inlet may be coupled to each of the individual vortex nozzles. In such a situation, a portion of the stream may concurrently flow into each vortex nozzle.

In some embodiments, the pressure of the stream in a vortex nozzle unit may be in the range of approximately 50 pounds per square inch (psi) to approximately 200 psi, approximately 80 psi to approximately 140 psi, or approximately 85 psi to approximately 120 psi. The stream may flow into a fluid treatment system at a flow rate of 1500 gallons per minute or less. In certain embodiments, a stream may flow into a fluid treatment unit at a flow rate of approximately 70 gallons to approximately 200 gallons per minute.

In some embodiments, hydrodynamic cavitation may occur as the stream passes through a vortex nozzle unit and/or when exit streams from the vortex nozzle units contact each other. In some embodiments, a plurality of vapor filled cavities and bubbles form if the pressure decreases to a level where the fluid boils. Boiling of the fluid may, in some embodiments, reduce an amount of dissolved gas (e.g., oxygen, carbon dioxide, ammonia, hydrogen cyanide, and/or hydrogen sulfide).

Fluid and cavitation bubbles may initially encounter a region of higher pressure when entering one or more of the vortex nozzle units in the system and encounter a vacuum area, at which point vapor condensation occurs within the bubbles and the bubbles collapse. The collapse of cavitation bubbles may cause hydrodynamic cavitations and pressure impulses. In some embodiments, the pressure impulses within the collapsing cavities and bubbles may be on the order of up to 1000 lbs/in$^2$. Hydrodynamic cavitation and/or other forces exerted on the fluid (e.g., pressure impulse, side walls of the nozzles) may cause changes in solubility of dissolved gasses, pH changes, formation of free radicals, and/or precipitation of dissolved ions such as phosphates, nitrates, calcium, iron, and carbonate. For example, the solubility of carbon dioxide in water may decrease upon treatment with a fluid treatment system (see TABLES 1 through 3).

TABLE 1

Carbon Dioxide Concentration, ppm

| Initial ppm | 1 Pass, ppm | 2 Passes, ppm | 3 Passes, ppm | 4 Passes, ppm | 6 Passes, ppm | 8 Passes, ppm |
|---|---|---|---|---|---|---|
| 126.5 | 89.5 | 64.8 | 45.8 | 33.1 | 18.1 | 10.4 |
| 70.9 | 50.1 | 32.5 | 26.2 | 19.9 | 11.4 | 7.3 |
| 52.2 | 38.6 | 27.9 | 20.7 | 15.3 | 8.9 | 6.0 |

TABLE 2

Amount of Carbon Dioxide Removed, ppm

| Initial CO$_2$ ppm | 1 Pass, ppm | 2 Passes, ppm | 3 Passes, ppm | 4 Passes, ppm | 6 Passes, ppm | 8 Passes, ppm |
|---|---|---|---|---|---|---|
| 126.8 | 37 | 61.7 | 80.7 | 93.3 | 108.3 | 116.1 |
| 73 | 24.8 | 37.3 | 46.6 | 53.5 | 62.3 | — |
| 70.9 | 20.8 | 35.5 | 44.7 | 51.0 | 59.5 | 63.6 |
| 52.2 | 13.5 | 24.2 | 31.5 | 36.9 | 43.2 | 46.2 |
| 27.2 | 8.4 | 13.0 | 16.4 | 18.9 | 21.7 | — |

TABLE 3

| No. of Passes | Accumulated Carbon Dioxide Removed, percent |
|---|---|
| 0 | 0 |
| 1 | 30 |
| 2 | 50 |
| 3 | 63 |
| 4 | 73 |
| 6 | 85 |
| 8 | 90 |

In some embodiments, hydrodynamic cavitation and/or the physical and mechanical forces created as the stream flows through the vortex nozzle units (e.g., shear collision and pressure/vacuum forces) may remove water, remove volatile organic compounds, remove dissolved gases, change particulate size, or combinations thereof.

Additionally, when streams of fluids containing water collide with a speed of at least 450 mph collide (e.g., between 450 mph to 600 mph), at least some of the oxygen-hydrogen bonds in the water may be broken. The fragments from the collision may reform to produce hydrogen peroxide and other highly reactive intermediates. Hydrogen peroxide and/or the other highly reactive intermediates formed by hydrodynamic cavitation and the high-speed collision of water may react with inorganic and organic impurities (e.g. chlorinated compounds, nitrates, ammonia, and/or phosphorous compounds) to form compounds that do not contaminant water bodies. For example, formation of hydrogen peroxide may dechlorinate chlorinated compounds in situ and/or oxidize oxygenated compounds in situ.

In some embodiments, one or more additives may be introduced into one or more of the vortex nozzle units via one or more additive inlets. Additives may include oxidation additives, biocides and nonbiocides. Oxidation additives may include, but are not limited to, hydrogen peroxide, compounds capable of releasing hydrogen peroxide, iron in combination with hydrogen peroxide and/or ozone. In some embodiments, ultraviolet light may be directed towards the processing stream to catalyze and/or promote oxidation of contaminants.

In fluid treatment systems described herein, a "pass" through the fluid treatment system is defined as passing a fluid through the system for a time sufficient to pass the entire volume of a reservoir through the system. For example, if the reservoir to be treated by the fluid treatment system is a 20-gallon reservoir, a "pass" is complete when 20 gallons of fluid from the reservoir have gone through the fluid treatment system.

In some embodiments, all or a portion of the stream flowing out of the fluid treatment system may be recycled through the fluid treatment system via one or more recycle lines. Recycling the stream through the fluid treatment system for a number of passes may allow for significant reduction of the dissolved gases in the fluid stream. In some embodiments, a portion of the stream exiting the fluid treatment system may be mixed with a portion of the stream entering the fluid treatment system the inlet.

In some embodiments, the system may be monitored and/or adjustments made as needed to control the concentration dissolved gases in the streams. For example, concentration of dissolved gas (e.g., carbon dioxide, oxygen, hydrogen sulfide, ammonia, or mixtures thereof) may be monitored continuously or periodically by employing a gas chromatograph. Monitoring the concentration of dissolved gas continuously or periodically may allow for the adjustment of flow rates, number of recycles through the system, and/or the amount and/or type of additive introduced into the system so that the concentration of dissolved gas in the stream exiting the fluid treatment system is at or below a desired level.

Figure 9:
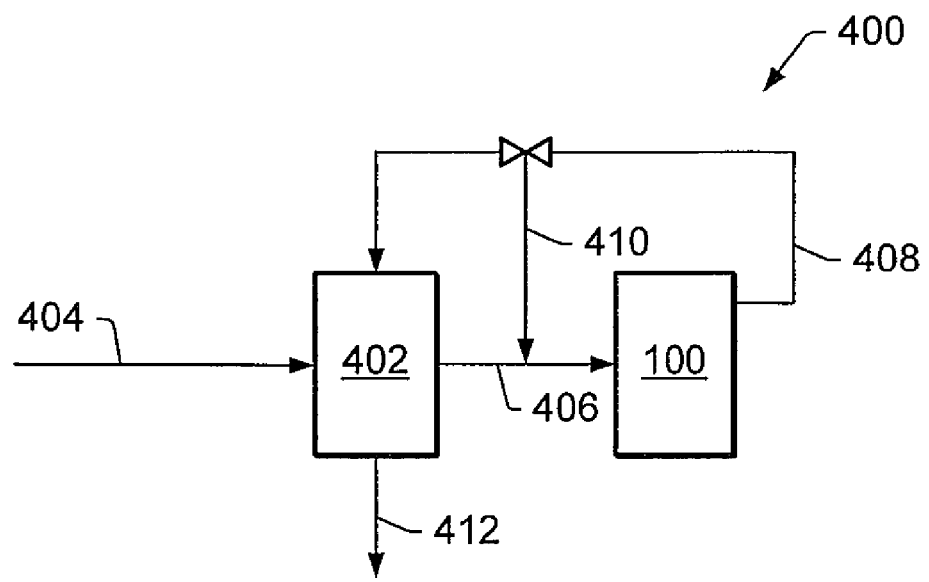
FIG. 9 depicts an embodiment of degassing a fluid that includes a fluid treatment system in combination with a reservoir.

In some embodiments, degassing system 400 includes a reservoir 402 and a fluid treatment system 100 coupled to the reservoir, as depicted in FIG. 9. Reservoir 402 receives fluid from via conduit 404. Conduit 406 may couple the reservoir to an inlet of fluid treatment system 100. Additional conduit 408 may couple the fluid treatment system back to the reservoir. During use, at least a portion of the water exiting the fluid treatment system may be recycled back into the fluid treatment system, rather than being sent to the reservoir or distributed to other processing units. Recycle conduit 410 may be coupled to exit conduit 408 to allow the fluid to be recycled. A three-way valve may be positioned at the intersection of conduits 408 and 410 to control the flow of the fluid. Degassed fluid may exit reservoir 402 via conduit 412.

Figure 10:
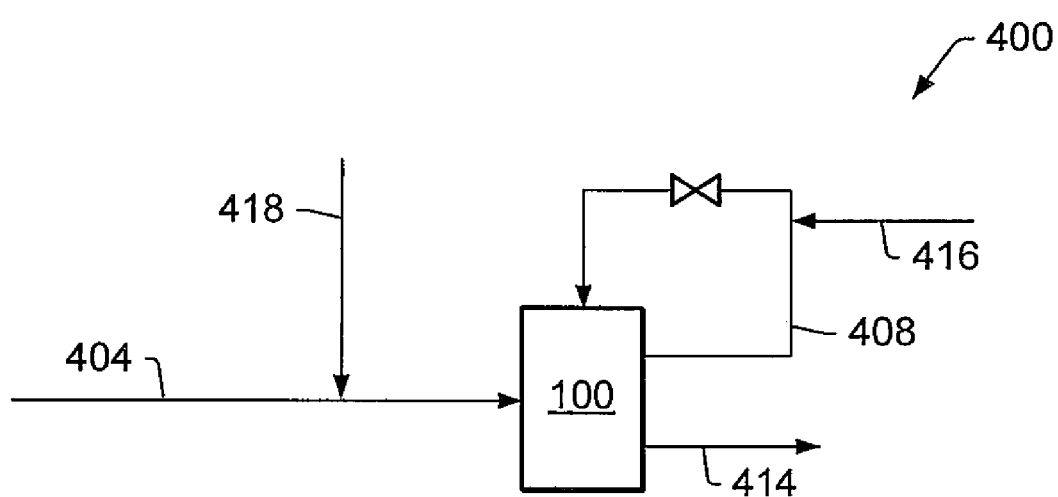
FIG. 10 depicts an embodiment of degassing a fluid with a fluid treatment system.

In other embodiments, reservoir 402 is not needed, as shown in FIG. 10. Fluid treatment system 100 receives fluid via conduit 404. Additional conduit 408 may recycle the fluid back to fluid treatment system 100. During use, at least a portion of the fluid exiting the fluid treatment system may be recycled back into the fluid treatment system, rather than being sent to storage facilities and/or other processing units via conduit 414. A three-way valve may be positioned at in conduit 408 to control the flow of the recycled fluid to fluid treatment system 100. Additives may be introduced to fluid treatment system 100 via conduit 416 and/or 418. In some embodiments, additive conduits 418 and 420 are not needed.

In an embodiment, the amount of dissolved gas in the fluid may be assessed prior to introducing the fluid into the fluid treatment system. For example, a sample from reservoir 402 and/or fluid treatment system 100 may be removed and tested for concentration of dissolved gases. Alternatively, in-line monitoring equipment may be coupled to conduits 408 and 410 to allow continuous monitoring of the dissolved gases in reservoir 402 and/or fluid treatment system 100. Once a concentration of dissolved gases is assessed, the amount of passes through the fluid treatment system can be estimated and/or oxidation additives may be added to fluid treatment system 100 and/or reservoir 402 via conduits 416 and/or 418.

In this patent, certain U.S. patents and other materials (e.g., articles) have been incorporated by reference. The text of such U.S. patents and other materials is, however, only incorporated by reference to the extent that no conflict exists between such text and the other statements and drawings set forth herein. In the event of such conflict, then any such conflicting text in such incorporated by reference U.S. patents and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for degassing a fluid comprising:
   drawing fluid from a reservoir;
   introducing the fluid into a fluid treatment system, the fluid treatment system comprising a first vortex nozzle unit and a second vortex nozzle unit positioned in substantially opposed relation to the first vortex nozzle unit;
   passing a fluid stream of the fluid through the fluid treatment system in passes, wherein each pass through the fluid treatment system comprises:
      flowing a first portion of the fluid stream through the first vortex nozzle unit;
      flowing a second portion of the fluid stream through the second vortex nozzle unit; and
      contacting the first portion of the fluid stream exiting the first vortex nozzle unit with the second portion of the fluid stream exiting the second vortex nozzle unit; and
      wherein contacting the fluid stream exiting the first vortex nozzle unit with the fluid stream exiting the second vortex nozzle unit removes at least a portion of one or more dissolved gases in the fluid stream;
   monitoring a concentration of at least one dissolved gas exiting the fluid treatment system comprising the first vortex nozzle unit and the second vortex nozzle unit; and
   recycling the fluid through the fluid treatment system comprising the first vortex nozzle unit and the second vortex nozzle unit for additional passes until the monitored concentration of the at least one dissolved gas in the fluid exiting the fluid treatment system is within a predetermined acceptable range.

2. The method of claim 1, wherein the first vortex nozzle unit has a single vortex nozzle.

3. The method of claim 1, wherein at least one of the first vortex nozzle units has a plurality of vortex nozzles.

4. The method of claim 1, wherein the plurality of vortex nozzles are in a cascade configuration.

5. The method of claim 1, further comprising an additive conduit coupled to the first vortex nozzle unit, and the method further comprises introducing of an additive to the fluid stream as the fluid stream passes through the first vortex nozzle unit.

6. The method of claim 1, wherein the first vortex nozzle unit comprises a vortex nozzle comprising a nozzle body including a passageway therethrough, a plurality of inlet ports, and an end cap attached to the nozzle body.

7. The method of claim 1, further comprising introducing an additive to the reservoir, wherein the additive enhances removal of the dissolved gas.

8. The method of claim 1, wherein one or more of the dissolved gases comprises carbon dioxide, oxygen, ammonia, hydrogen sulfide, carbon oxide, methane, ethane, or mixtures thereof.

9. The method of claim 1, wherein at least one of the dissolved gases comprises carbon dioxide.

10. The method of claim 1, wherein at least one of the dissolved gases comprises oxygen.

11. The method of claim 1, wherein at least one of the dissolved gases comprises methane.

12. The method of claim 1, wherein recycling the fluid through the fluid treatment system for additional passes comprises returning fluid to the reservoir and drawing the fluid from the reservoir.

13. The method of claim 12, wherein fluid is drawn from and returned to the reservoir continuously.

14. The method of claim 1, wherein recycling the fluid through the fluid treatment system for additional passes comprises mixing the recycled fluid with the fluid introduced into the fluid treatment system.

15. The method of claim 1, further comprising returning a first portion of the fluid exiting the fluid treatment system to the reservoir, mixing a second portion of the fluid exiting the fluid treatment system with the fluid introduced into the fluid treatment system, and recycling the second portion through the fluid treatment system.

16. The method of claim 1, further comprising adjusting a flow rate through the fluid treatment system based on the monitored concentration of the at least one dissolved gas.

17. The method of claim 1, further comprising adjusting a number of passes through the fluid treatment system based on the monitored concentration of the at least one dissolved gas.

18. The method of claim 1, further comprising adjusting an amount or type of additive introduced into the fluid based on the monitored concentration of the at least one dissolved gas.

19. The method of claim 1, further comprising directing ultraviolet light toward the stream of fluid so as to catalyze or promote oxidation of contaminants in the fluid.

* * * * *